United States Patent
Brengel et al.

(10) Patent No.: US 11,564,420 B2
(45) Date of Patent: Jan. 31, 2023

(54) WEARABLE APPARATUS FOR WIRED OR WIRELESS CHARGING OF AN ELECTRONIC DEVICE

(71) Applicant: ICS INNOVATION LLC, Mineola, NY (US)

(72) Inventors: Matthew Brengel, Old Westbury, NY (US); Wieslaw Bober, Astoria, NY (US)

(*) Notice: Subject to any disclaimer, the term of this patent is extended or adjusted under 35 U.S.C. 154(b) by 713 days.

(21) Appl. No.: 16/488,521

(22) PCT Filed: Feb. 27, 2018

(86) PCT No.: PCT/US2018/019973
§ 371 (c)(1),
(2) Date: Aug. 23, 2019

(87) PCT Pub. No.: WO2018/157140
PCT Pub. Date: Aug. 30, 2018

(65) Prior Publication Data
US 2020/0037674 A1 Feb. 6, 2020

Related U.S. Application Data

(60) Provisional application No. 62/464,126, filed on Feb. 27, 2017.

(51) Int. Cl.
*H04R 1/10* (2006.01)
*A41D 1/00* (2018.01)

(52) U.S. Cl.
CPC ............ *A41D 1/002* (2013.01); *H04R 1/1008* (2013.01); *H04R 1/1016* (2013.01); *H04R 1/1025* (2013.01); *H04R 1/1041* (2013.01); *H04R 2420/07* (2013.01)

(58) Field of Classification Search
CPC .. H04R 1/1041; H04R 1/1008; H04R 1/1066; H04R 2420/09
See application file for complete search history.

(56) References Cited

U.S. PATENT DOCUMENTS

| | | | | |
|---|---|---|---|---|
| 5,551,065 | A | * | 8/1996 | Honore .................. H04B 1/20 455/66.1 |
| 9,832,560 | B1 | * | 11/2017 | Bagga .................. H02J 7/0044 |
| 2007/0032274 | A1 | * | 2/2007 | Lee ....................... H04R 1/1025 455/575.2 |
| 2009/0052717 | A1 | | 2/2009 | Chi |
| 2009/0296955 | A1 | | 12/2009 | Shaffer et al. |
| 2010/0260349 | A1 | | 10/2010 | Chen |
| 2012/0300962 | A1 | | 11/2012 | Devoto |
| 2013/0177186 | A1 | * | 7/2013 | Schul ..................... H02J 50/10 381/300 |
| 2014/0015470 | A1 | * | 1/2014 | Lim ........................ H02J 7/32 320/101 |

OTHER PUBLICATIONS

PCT/ISA/210 Search Report issued on PCT/US2018/019973, pp. 3.
PCT/ISA/237 Written Opinion issued on PCT/US2018/019973, pp. 7.

* cited by examiner

*Primary Examiner* — Amir H Etesam
(74) *Attorney, Agent, or Firm* — The Farrell Law Firm, P.C.

(57) ABSTRACT

A wearable electronic device is provided that includes a battery, at least one solar panel configured to charge the battery, an output charger connected through a wire to the out least one solar panel, and a controller configured to charge an external electronic device through the output charger.

17 Claims, 9 Drawing Sheets

WEARABLE APPARATUS FOR WIRED OR WIRELESS CHARGING OF AN ELECTRONIC DEVICE

PRIORITY

This application claims priority under 35 U.S.C. § 119(a) to U.S. Provisional Patent Application No. 62/464,126, which was filed in the United States Patent and Trademark Office on Feb. 27, 2017, the entire content of which is incorporated herein by reference.

BACKGROUND

1. Field of the Disclosure

The present disclosure relates generally to a wearable device for charging an external electronic device.

2. Description of the Related Art

In recent years, the use of electronic devices has increased. In particular, electronic devices that hold a charge and use a battery are commonplace in today's society. Some electronic devices, such as mobile devices, for example, are capable of wireless charging.

Wireless charging is advantageous for users because of its convenience. User's may place their electronic device in a wireless charging area (i.e., near a charging pad) to begin charging their device without being required to plug in their devices, as is the case with wall chargers and other traditional charging mechanisms.

However, like traditional charging mechanisms, wireless chargers are stationary and are commonly plugged into a wall or a fixed power source. Thus, electronic device users are burdened because, even with wireless charging, electronic devices may need to remain in one location in order to be charged.

Thus, a portable, on-the-go charging apparatus may be beneficial to users.

SUMMARY

The present disclosure has been made to address at least the above mentioned problems and/or disadvantages and to provide at least the advantages described below.

According to an embodiment of the present disclosure, a wearable electronic device is provided that includes a battery, at least one solar panel configured to charge the battery, an output charger connected through a wire to the least one solar panel, and a controller configured to charge an external electronic device through the output charger.

According to another embodiment of the present disclosure, a method performed by a wearable electronic device, includes charging a battery of the wearable electronic device with at least one solar panel of the wearable electronic device, charging the external electronic device through an output charger of the wearable electronic device connected through a wire to the at least one solar panel of the wearable electronic device, receiving audio information from the external electronic device; and outputting the audio information through at least one speaker while the external electronic device is being charged through the output charger.

According to another embodiment of the present disclosure, a method performed by a wearable electronic device for charging an external electronic device, includes charging a battery of the wearable electronic device with at least one solar panel of the wearable electronic device, and charging the external electronic device through an output charger of the wearable electronic device connected through a wire to the at least one solar panel of the wearable electronic device, wherein the wearable electronic device comprises a shirt.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

An embodiment of the present disclosure is directed to a wearable device including an output charger for charging an external device, and is described in detail with reference to the accompanying drawings. Detailed descriptions of constructions or processes known in the art may be omitted to avoid obscuring the subject matter of the present disclosure.

The same numbering is used to correspond to similar elements appearing in multiple figures. The descriptions of similar elements may be omitted when those elements have already been described with respect to a previous figure.

Figure 1:
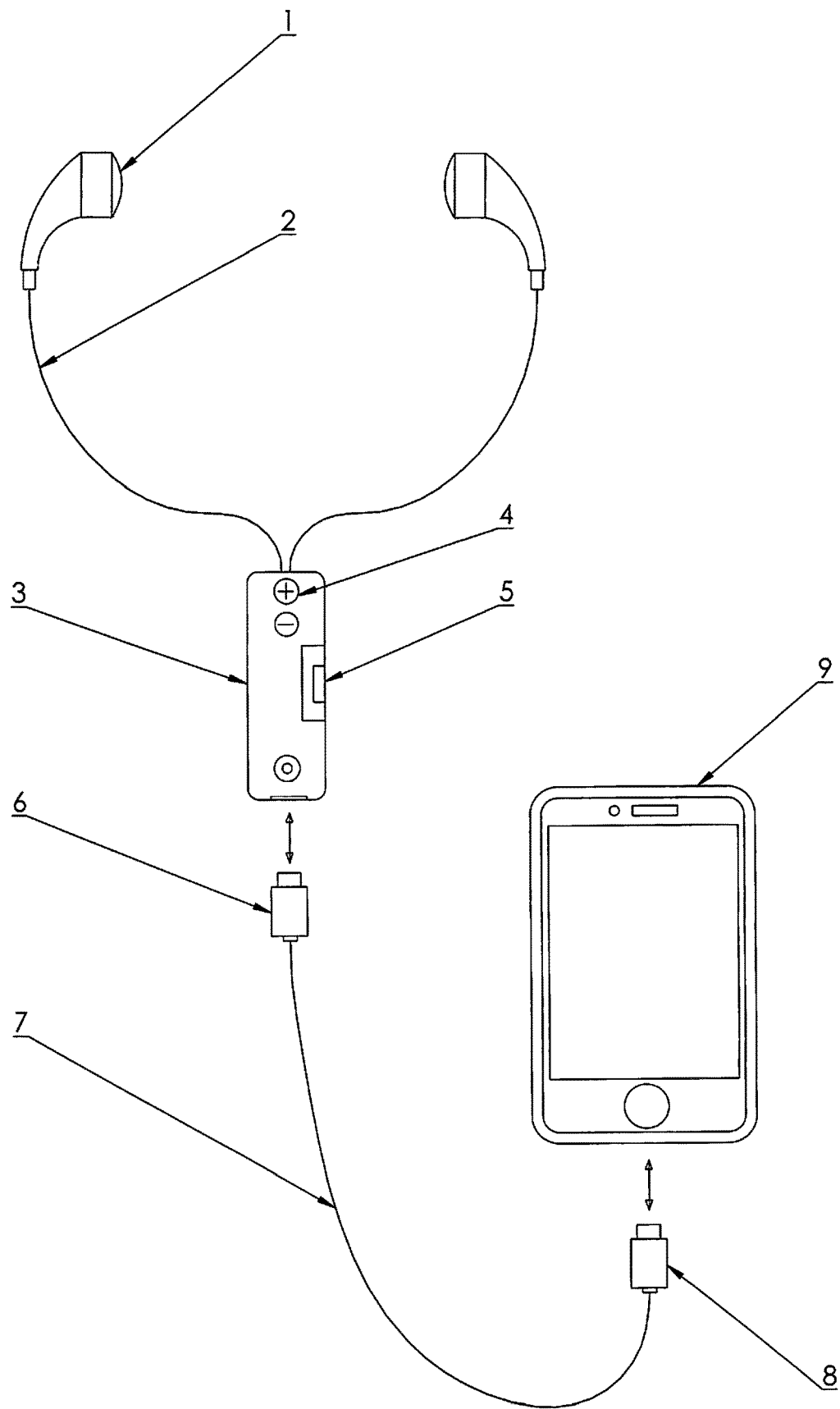
FIG. 1 is a functional diagram of ear pod headphones and a mobile device connectable through a wire, according to an embodiment of the present disclosure.

Referring initially to FIG. 1, a functional diagram of ear pod headphones (or ear buds) and a mobile device (i.e., a smartphone) connectable through a wire is shown, according to an embodiment of the present disclosure.

The ear pod headphones allow a user to listen to audio data from a mobile device 9 while simultaneously charging the mobile device 9. The ear pods 1 are small enough to fit into a user's ear and are attached to the battery case 3 with the ear pod cable 2. The ear pod headphones 1 may also receive audio information through short range wireless communication, such as Bluetooth. The battery case 3 includes buttons 4 for controlling functions of the ear pod headphones, such as a power state, playback mode, an output volume, a connection status, or audio output. The battery case 3 further includes a battery pocket 5 for housing a rechargeable battery.

The ear pod headphones are wireless headphones with on-the-go charging capabilities. The connecting cable 7 includes a connector 6 on one end and a mobile device connector 8 on the other end. The connector 6 is a plug that connects and disconnects with the battery case 3 to form an electrical connection with the mobile device 9. Likewise, the mobile device connector 8 is a plug that connects and disconnects with the mobile device 9 to form an electrical connection with the ear pod headphones. Thus, the ear pod headphones may be charged through the connecting cable 7.

The ear pod headphones 1 are compatible with various mobile devices, such as Apple IPhone™, Samsung Galaxy™, and Google Pixel™.

Figure 2:
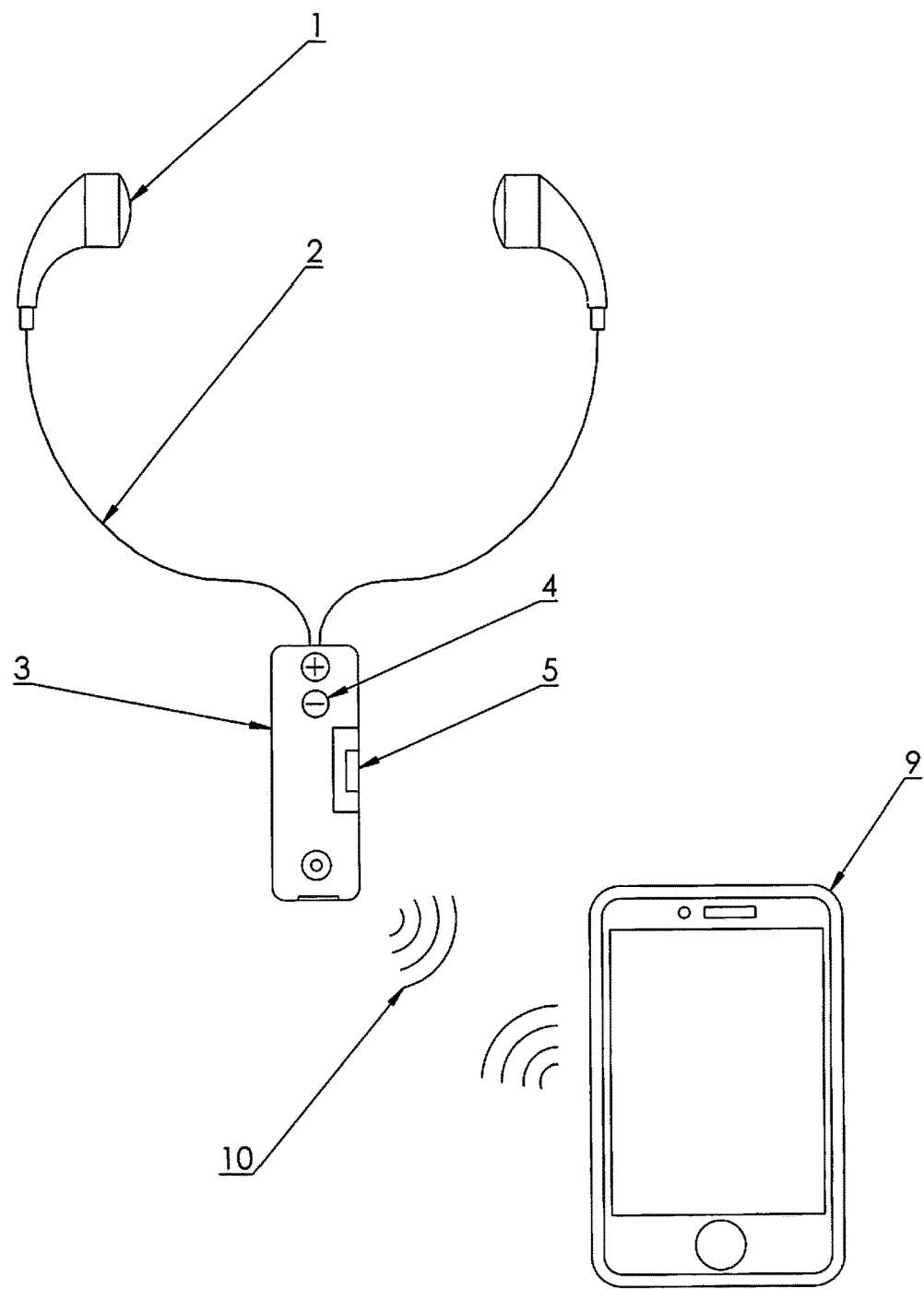
FIG. 2 is a functional diagram of ear pod headphones and a mobile device connectable through a wireless connection, according to an embodiment of the present disclosure.

FIG. 2 is a functional diagram of ear pod headphones and a mobile device connectable through a wireless connection, according to an embodiment of the present disclosure.

Referring to FIG. 2, the ear pod headphones may include a wireless power transmitter and/or receiver for wirelessly transmitting or receiving power from the mobile device 9 to charge the ear pod headphones through a wireless connection 10.

Furthermore, the wireless ear pod headphones may simultaneously wirelessly transmit or receive power while receiving audio information for audio output. Accordingly, the wireless ear pod headphones may be charged at the same time in which they wirelessly receive and output audio information.

Figure 3:
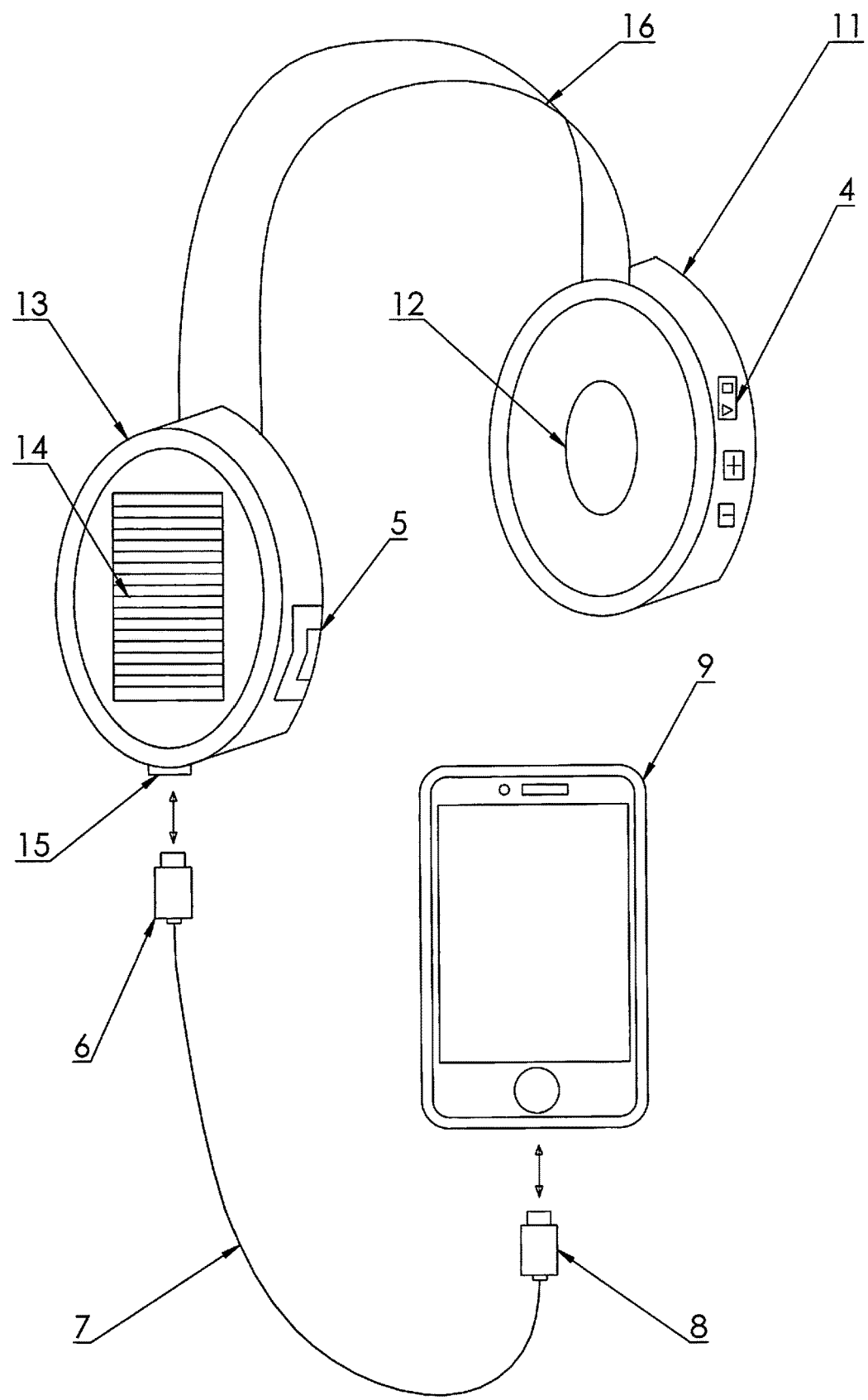
FIG. 3 is a functional diagram of headphones and a mobile device connectable through a wire, according to an embodiment of the present disclosure.

FIG. 3 is a functional diagram of headphones and a mobile device connectable through a wire, according to an embodiment of the present disclosure.

Referring to FIG. 3, headphones 11 are over the ear headphones (i.e., on the ear headphones or over the head headphones, including noise cancelling headphones). The over the ear headphones 11 include at least one ear speaker 12 for outputting audio information received from the mobile device 9.

The over the ear headphones 11 allow a user to simultaneously listen to audio data transmitted from a mobile device 9 while charging the mobile device 9. The over the ear headphones 11 may receive audio information through short range wireless communication, such as Bluetooth. At least one head phone case 13 protects and houses the at least one ear speaker 12 and includes buttons 4 for controlling a power state, playback mode, an output volume, a connection status, audio output, etc. The head phone case 13 further includes a battery pocket 5 for housing a rechargeable battery.

The over the ear headphones 11 may be wireless headphones with on-the-go charging capabilities. The connecting cable 7 includes a connector 6 on one end and a mobile device connector 8 on the other end. The connector 6 may connect and disconnect to a head phone connector 15 (i.e., a female adapter) to form an electrical connection with the mobile device 9. Likewise, the mobile device connector 8 may connect and disconnect to the mobile device 9 to form an electrical connection with the over the ear headphones 11. Thus, the over the ear headphones 11 may be charged through the connecting cable 7.

The over the ear headphones 11 include at least one solar panel 14, such as a photovoltaic cell, mounted on the exterior of the at least one head phone case 13. The solar panel 14 may be mounted on the exterior of an ear portion of the head phone case 13, or may be mounted on the band portion 16 connecting the head phone cases 13.

The solar panel 14 is capable of absorbing sunlight as a source of energy to generate electricity. The generated electricity may charge the over the ear headphones 11 by being stored in a battery included in the battery pocket 5 of the over the ear headphones 11, or the generated electricity may be output to charge the mobile device 9.

When the generated electricity is output to charge the mobile device 9, the generated electricity is transferred from the solar panel 14 to the head phone connector 15 when the connector 6 of the connecting cable 7 is attached. The generated electricity may be transferred through the connecting cable 7 to the mobile device 9 when the mobile device 9 is attached to the mobile device connector 8. Thus, the mobile device 9 may receive a charge generated by the solar panel 14 of the over the ear head phones 11.

The over the ear headphones 11 are compatible with various mobile devices, such as Apple IPhone™, Samsung Galaxy™, and Google Pixel™.

Figure 4:
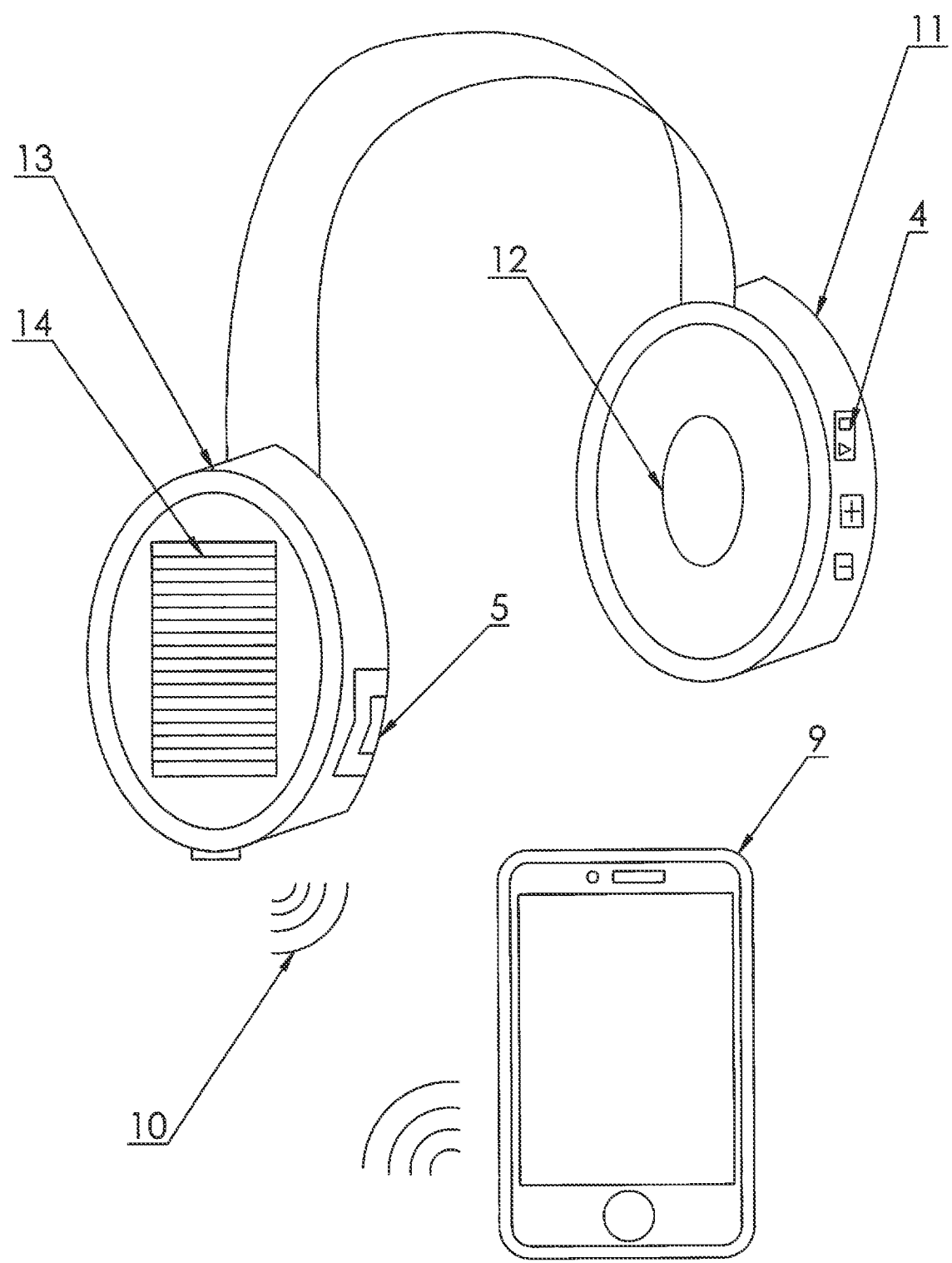
FIG. 4 is a functional diagram of headphones and a mobile device connectable through a wireless connection, according to an embodiment of the present disclosure.

FIG. 4 is a functional diagram of the over the ear headphones and a mobile device connectable through a wireless connection, according to an embodiment of the present disclosure.

Referring to FIG. 4, the over the ear headphones 11 may include a wireless power transmitter and/or receiver for wirelessly transmitting or receiving power from the mobile device 9 to charge the mobile device 9 through a wireless connection 10.

Furthermore, the wireless over the ear headphones 11 may simultaneously wirelessly transmit or receive power while receiving audio information for audio output. Therefore, the wireless over the ear headphones 11 may charge the mobile device 9 at the same time in which the over the ear headphones 11 wirelessly receive audio information from the mobile device 9 and output the audio information through the at least one ear speaker 12.

In the embodiments shown and described herein, circuitry may be provided that enables the devices to determine which has a greater charge remaining, and then may determine which device will be used to charge the other device. Such an intelligent system will direct power to the device that is more in need of a charge.

Figure 5:
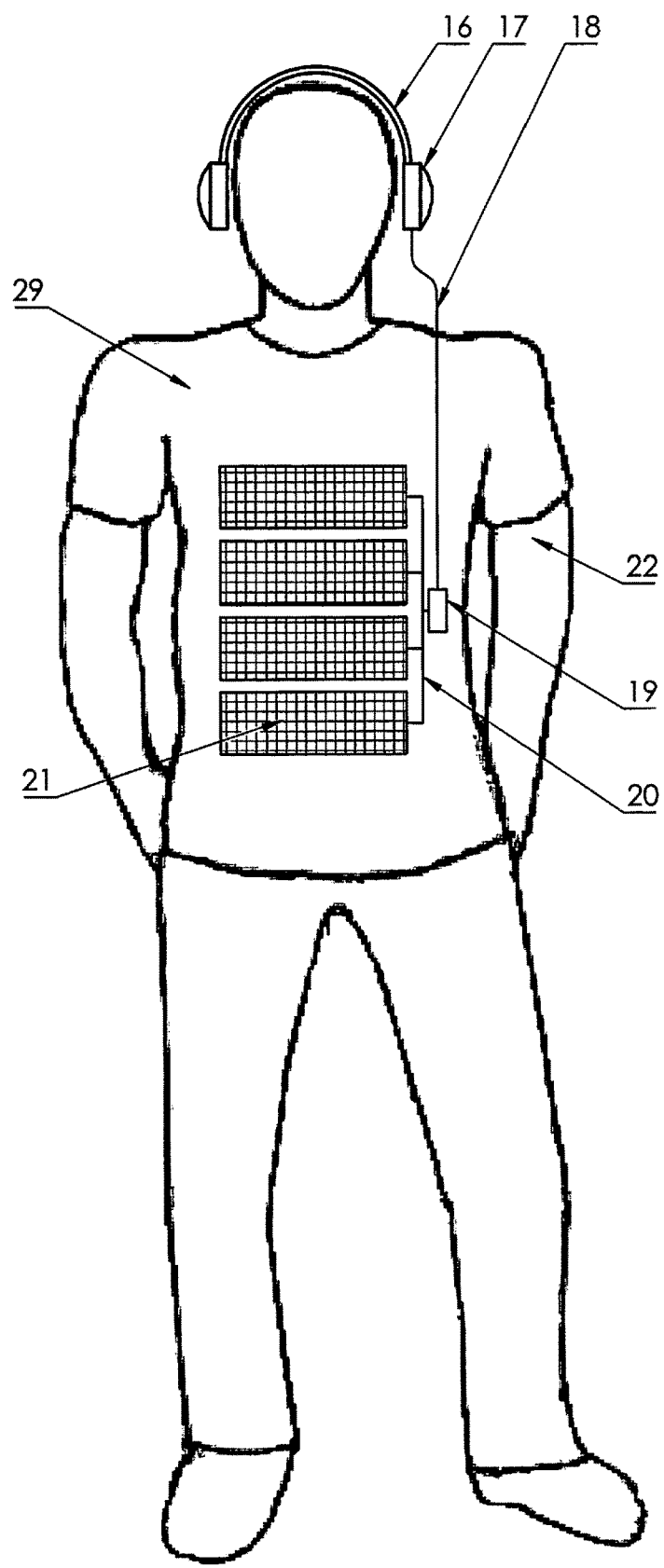
FIG. 5 is a functional diagram of a wire connection between headphones and a charging shirt, according to an embodiment of the present disclosure.

FIG. 5 is a functional diagram of a wire connection between headphones and a charging shirt, according to an embodiment of the present disclosure.

Referring to FIG. 5, the headphones may be over the ear headphones including a holder or band 16 designed to be placed over the head of a user 22 to hold ear speakers 17 over the user's ears. The ear speakers 17 are connected to a connection and control module 19 mounted on (i.e., embedded in) a shirt 29 (i.e., a t-shirt, sweatshirt, or jacket) through a wire 18.

The connection and control module 19 is connected to photovoltaic cells 21 through a wire 20 and controls electrical power to and charging of other devices. Electrical power may be produced by the photovoltaic cells 21 mounted directly on the shirt 29. The photovoltaic cells 21 are flexible and may bend in different directions without being damaged, and a number of panels may be provided to facilitate bendability.

The electrical power produced by the photovoltaic cells 21 may be controlled by the connection and control module 19 to charge the over the ear headphones through the wire 18.

Figure 6:
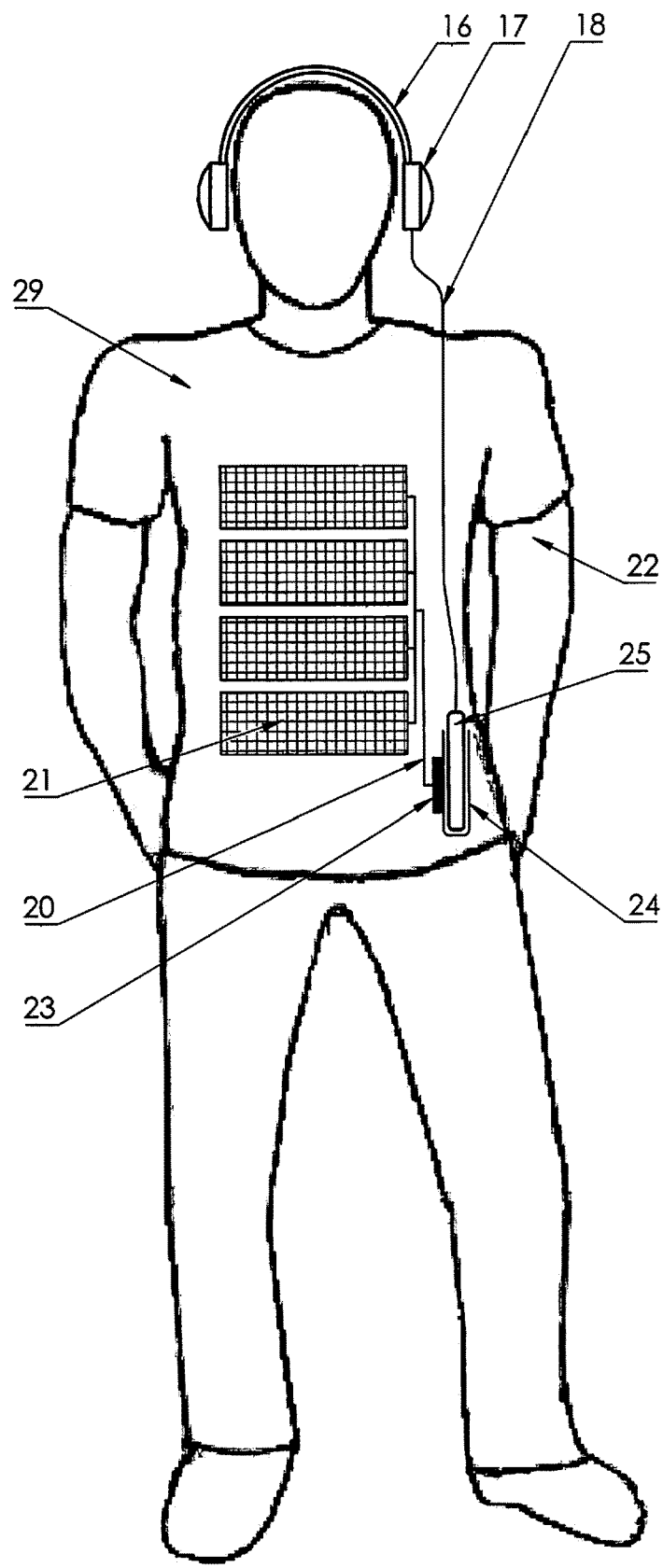
FIG. 6 is a functional diagram of a wire connection between headphones and a charging shirt which can wirelessly charge a mobile device, according to an embodiment of the present disclosure.

FIG. 6 is a functional diagram of a wire connection between headphones and a charging shirt which can wirelessly charge a mobile device, according to an embodiment of the present disclosure.

Referring to FIG. 6, a wireless charger 23 for charging an external device 25 (i.e., a mobile device or smartphone) is mounted near a device pocket 24. The wireless charger 23 may be embedded into the shirt 29 or may be mounted onto the shirt 29. Electrical power produced by the photovoltaic cells 21 may be transmitted through the wire 20 to the wireless charger 23 to distribute the electrical power.

The wireless charger 23 may be an inductive charger capable of producing an electromagnetic field to transfer energy through electromagnetic induction. The wireless charger may include an induction coil to create an alternating electromagnetic field for charging. The induction coil may be rigid or flexible.

The device pocket 24 may be conveniently located near the wireless charger 23. This arrangement may allow for a user to place an external device 25 into the device pocket 24 so that the external device 25 may receive a wireless charge from the photovoltaic cells 21 mounted on the user's shirt 29. Thus, the external device 25 may wirelessly receive a charge while the user 22 is on the go (i.e., not stationary).

Figure 7:
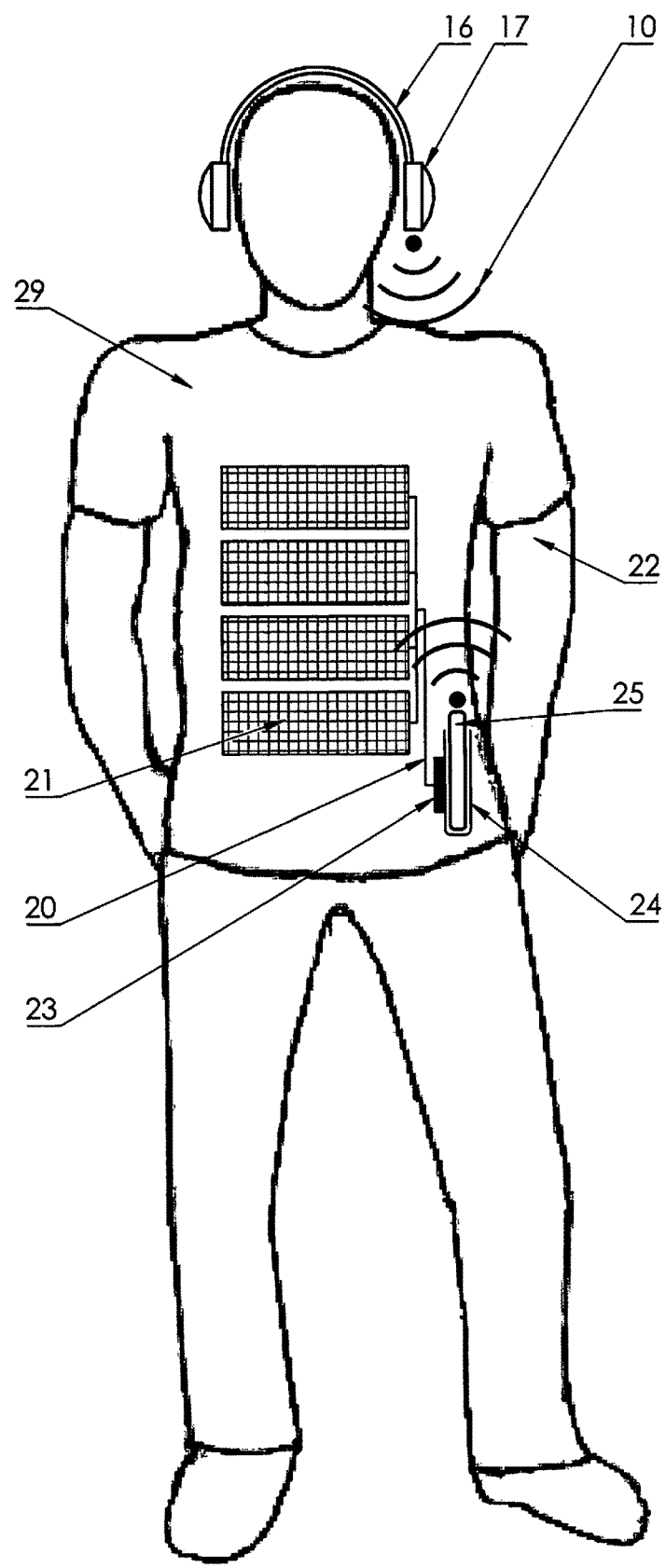
FIG. 7 is a functional diagram of a wireless connection between headphones and a charging shirt which can wirelessly charge a mobile device, according to an embodiment of the present disclosure.

FIG. 7 is a functional diagram of a wireless connection between headphones and a charging shirt which can wirelessly charge a mobile device, according to an embodiment of the present disclosure.

Referring to FIG. 7, the photovoltaic cells 21 may generate an electrical charge to wirelessly charge the external device 25 through the wireless charger 23. The external device 25 may be wirelessly coupled to the headphones of the user such that the headphones simultaneously receive audio information (i.e., through Bluetooth) and/or electrical power wirelessly transmitted from the external device 25.

Figure 8:
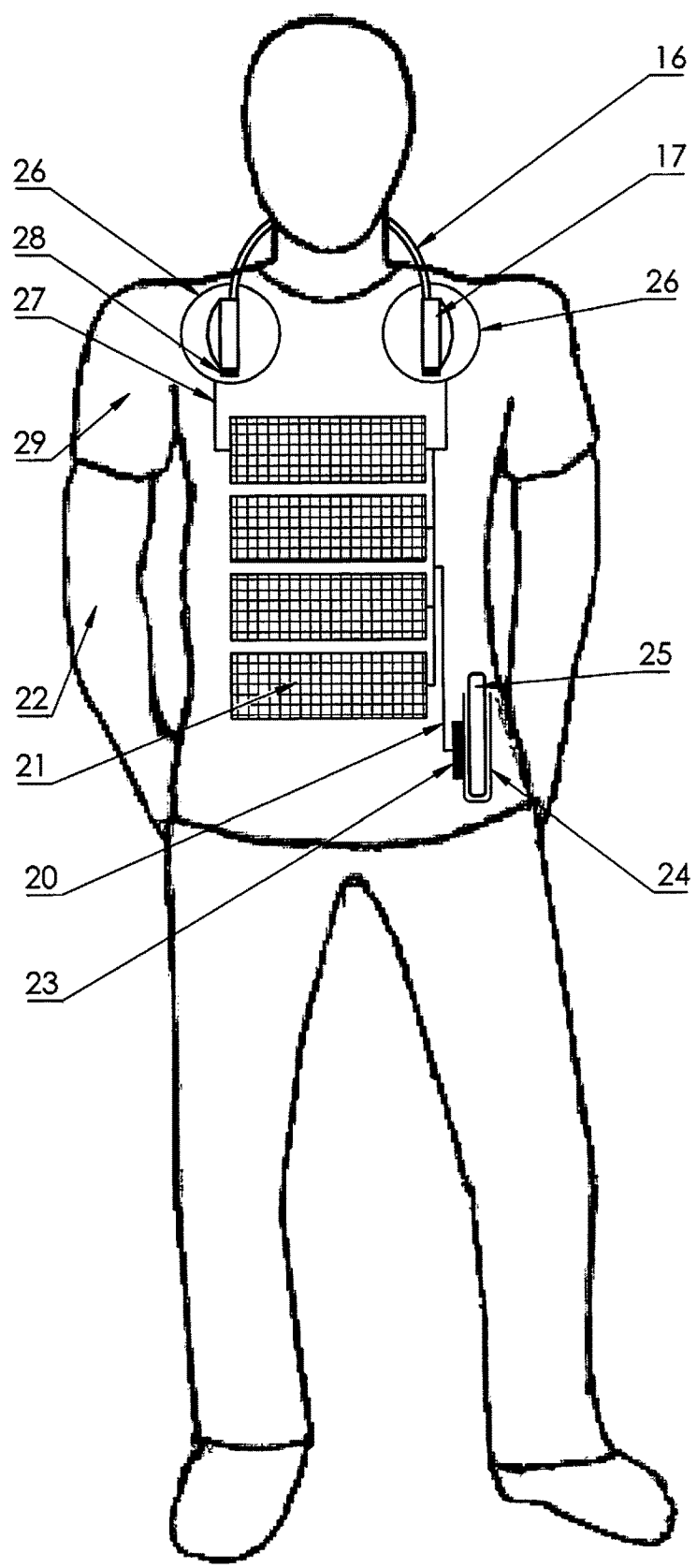
FIG. 8 is a functional diagram of headphones and a charging shirt which can wirelessly charge a mobile device and the headphones, according to an embodiment of the present disclosure.

FIG. 8 is a functional diagram of headphones and a charging shirt which can wirelessly charge a mobile device and the headphones, according to an embodiment of the present disclosure.

Referring to FIG. 8, the headphones of the user 22 may be wirelessly charged while the headphones are in a resting position around the user's neck such that the ear speakers 17 rest near the user's shoulder area. Furthermore, the headphones include wireless power receivers 28 mounted on the ear speakers 17 or holder 16 of the headphones. For example, each ear speaker 17 may have a wireless power receiver 28 attached to its exterior casing. The wireless power receivers 28 receive wireless power.

Electric power produced by the photovoltaic cells 21 embedded on the user's 22 shirt 29 may be transmitted through wire 27 to wireless chargers or charging pads 26 that are mounted (i.e., embedded) on the shoulder area of the user's shirt 29. The ear speakers 17 may rest on the wireless charging pads 26 for charging. The wireless charging pads 26 may wirelessly transmit the electric power to the wireless power receivers 28 to charge the headphones.

The wireless charging pads 26 that are mounted on the user's shirt 29 may be inductive chargers and may include induction coils to create an alternating electromagnetic field for charging. The induction coils may be rigid or flexible.

Accordingly, the user 22 may conveniently charge his/her headphones by resting them around his/her neck on his/her shoulders. This permits the user 22 to charge the headphones on the go, while they are not being used.

The electrical power generated by the photovoltaic cells 21 may be simultaneously transmitted to the headphones and the external device 25 at the same time. For example, when an external device 25 is placed in the device pocket 24 and the wireless power receivers 28 of the headphones are placed on the wireless charging pads 26 mounted on the shirt 29, then electrical power may be simultaneously transmitted from the photovoltaic cells 21 through the wire 20 to the wireless charger 23 and from the photovoltaic cells 21 through the wire 27 to the wireless charging pads 26. Thus, simultaneous wireless charging of a plurality of external devices can be achieved with the shirt 29.

Further, the headphones may be wirelessly coupled to the external device 25, and the external device 25 may wirelessly transmit audio information to the headphones. In addition, the external device 25 may wirelessly transmit electrical power to the headphones. Alternatively, the headphones may wirelessly transmit electrical power to the external device 25.

Figure 9:
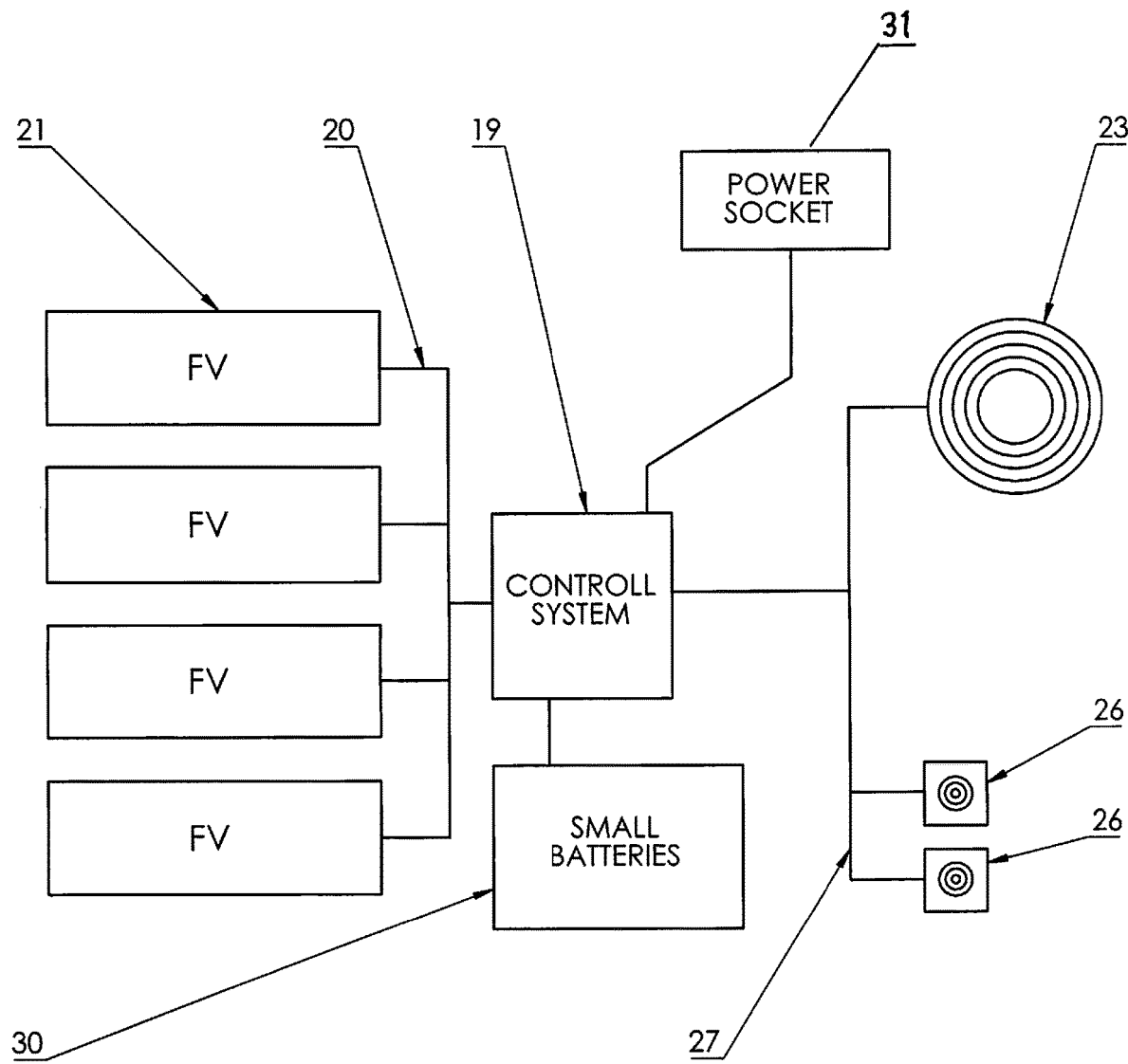
FIG. 9 is a schematic diagram of electrical connections and power distribution circuitry, according to an embodiment of the present disclosure.

FIG. 9 is a schematic perspective of electrical connections and power distribution circuitry, according to an embodiment of the present disclosure.

Referring to FIG. 9, the electrical connections and power distribution circuitry may be included in the shirt 29. In addition to the components described with respect to the aforementioned figures, the circuitry may include a small battery 30 or a charging capacitor for temporarily holding an electrical charge. The electrical charge stored in the small battery 30 may be distributed to the external devices for charging at a desired time (i.e., when there is a lack of light and photovoltaic cells 21 are not generating enough power).

In addition, the electrical circuitry may include a power socket for wire charging. Electric power may be distributed from the power socket 31 to the wireless chargers 23 and wireless charging pads 26 to be output for wireless charging.

While the disclosure has been shown and described with reference to certain embodiments thereof, it will be understood by those skilled in the art that various changes in form and details may be made therein without departing from the spirit and scope of the disclosure.

What is claimed is:

1. A wearable electronic device comprising:
 a battery;
 at least one solar panel mounted to the wearable electronic device and configured to charge the battery;
 an output charger connected through a wire to the at least one solar panel; and
 a controller configured to charge an external electronic device through the output charger,
 wherein the wearable electronic device comprises a shirt, and
 wherein the output charger is comprised of two wireless headphone chargers mounted near shoulder areas of the shirt and is connected through a wire to the at least one solar panel.

2. The wearable electronic device of claim 1, further comprising wearable headphones or ear pods, including at least one speaker.

3. The wearable electronic device of claim 2, wherein the controller is further configured to receive and output audio information through the at least one speaker.

4. The wearable electronic device of claim 3, wherein the controller is further configured to simultaneously charge the external electronic device through the output charger and output the audio information through the at least one speaker.

5. The wearable electronic device of claim 3, further comprising at least one button to control a playback mode of the at least one speaker.

6. The wearable electronic device of claim 2, wherein the output charger is a wireless output charger, and the controller is further configured to wirelessly charge the external electronic device through the wireless output charger.

7. The wearable electronic device of claim 6, wherein the controller is further configured to wirelessly receive and output audio information through the at least one speaker.

8. The wearable electronic device of claim 7, wherein the controller is further configured to simultaneously wirelessly charge the external electronic device through the wireless output charger and wirelessly output the received audio information through the at least one speaker.

9. The wearable electronic device of claim 2, further comprising an external electronic device pocket that is mounted on the shirt at a position adjacent to the output charger,
wherein the output charger is a wireless charger connected through a wire to the at least one solar panel and wirelessly charges an external electronic device placed in the external electronic device pocket.

10. The wearable electronic device of claim 9, further comprising an additional output charger comprising two wireless headphone chargers mounted near shoulder areas of the shirt and connected through a wire to the at least one solar panel.

11. The wearable electronic device of claim 10, wherein the controller is further configured to simultaneously control the output charger to wirelessly charge an external electronic device placed in the external electronic device pocket and control the additional output charger to wirelessly charge the headphones placed near the shoulder areas of the shirt.

12. The wearable electronic device of claim 11, wherein the external electronic device is wirelessly connected to the headphones.

13. The wearable electronic device of claim 1, wherein the external electronic device is configured to charge the headphones through a wire while the external electronic device is wirelessly being charged by the output charger.

14. A method performed by a wearable electronic device for charging an external electronic device, the method comprising:
charging a battery of the wearable electronic device with at least one solar panel of the wearable electronic device;
charging the external electronic device through an output charger of the wearable electronic device connected through a wire to the at least one solar panel of the wearable electronic device;
receiving audio information from the external electronic device; and
outputting the audio information through at least one speaker while the external electronic device is being charged through the output charger,
wherein the wearable electronic device comprises a shirt, and
wherein the output charger is comprised of two wireless headphone chargers mounted near shoulder areas of the shirt and connected through a wire to the at least one solar panel.

15. The method of claim 14, wherein charging the external electronic device comprises wirelessly charging the external electronic device through the output charger of the wearable electronic device.

16. A method performed by a wearable electronic device for charging an external electronic device, the method comprising:
charging a battery of the wearable electronic device with at least one solar panel of the wearable electronic device; and
charging the external electronic device through an output charger of the wearable electronic device connected through a wire to the at least one solar panel of the wearable electronic device,
wherein the wearable electronic device comprises a shirt, and
wherein the output charger is comprised of two wireless headphone chargers mounted near shoulder areas of the shirt and connected through a wire to the at least one solar panel.

17. The wearable electronic device of claim 16, wherein the output charger is a wireless charger connected through a wire to the at least one solar panel and wirelessly charges an external electronic device placed in an external electronic device pocket that is mounted on the shirt at a position adjacent to the output charger.

* * * * *